UNITED STATES PATENT OFFICE

HANS HAHL, OF ELBERFELD, GERMANY, ASSIGNOR TO WINTHROP CHEMICAL COMPANY, INC., OF NEW YORK, N. Y., A CORPORATION OF NEW YORK

NEW DIALKYLAMINO-ALKYLETHERS OF ALKYLPHENOLS

No Drawing. Original application filed July 18, 1927, Serial No. 206,793, and in Germany July 29, 1926. Divided and this application filed May 16, 1928. Serial No. 278,343.

The present invention relates to new dialkylamin-alkylethers of alkylolphenols, more particularly to new compounds of the general formula:

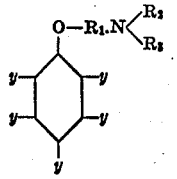

wherein one $y$ stands for an alkylol group, for instance: $-CH_2OH$ or $-CH_2CH_2OH$, the others for hydrogen, alkoxy, alkyl, alkylol or unsaturated aliphatic residues such as $CH.CH=CH_2$, $R_1$ for an alkyl radicle, $R_2$ and $R_3$ for alkyl radicles with less than three carbon atoms.

These new compounds may be obtained for instance by causing basic alkylhalogenides to act upon phenols containing at least one alkylol group in the presence of an alkaline reacting agent as for instance sodium alcoholate.

These compounds possess valuable physiological properties, showing for instance strong anaesthetic action and being of relatively low toxicity. The aqueous solutions do not cause any irritating action. They are generally weakly colored and viscous oils, easily soluble in acids.

The following examples will illustrate my invention, all parts being by weight:

*Example 1.*—20 parts of the sodium salt of eugenol methylol (Ber. d. Deutschen Chemischen Gesellschaft, vol. 35, page 3846) are heated for some time with 20 parts of diethylaminoethylchloride. When the reaction is complete, water is added, the separated oil removed and distilled. Under a pressure of 12 mm. at 213 to 215° C. a weakly yellow colored oil passes over and gives a crystalline salt with hydrochloric acid. The base has the following constitution:

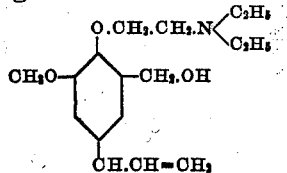

*Example 2.*—3.7 parts of sodium are dissolved in 50 parts of alcohol. 20 parts of saligenin and 30 parts of diethylaminoisobutlychloride of the formula:

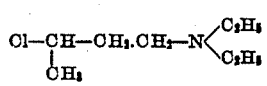

are added and the whole is heated for 5 hours. When the reaction is complete, the mass is poured into water. The oil which separates is removed, dried and distilled. Under a pressure of 15 mm. at 190 to 198° C. a yellow liquid passes over. The base has the following constitution:

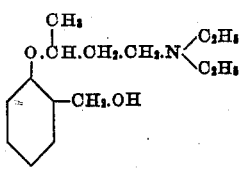

*Example 3.*—20 parts of sodium salt of o-o'-dimethylol-p-cresol (Ber. d. Deutschen Chemischen Gesellschaft, vol. 35 p. 3846) are heated for about 3 hours with 20 parts of diethylaminoethylchloride. After adding water, the oil which separates is removed, dried and distilled. Under a pressure of 12 mm. at 213 to 218° C. a yellow liquid passes over. The base has the following constitution:

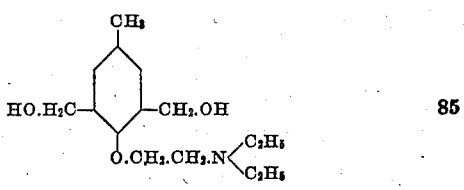

This is a division of my application Ser. No. 206,793, filed July 18, 1927.

I claim:

As a new product the compound of the formula:

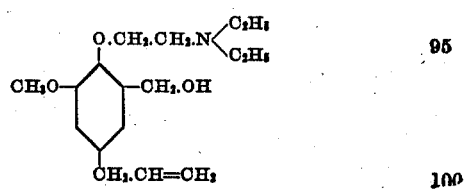

which is a weakly yellow colored oil boiling under a pressure of 12 mm. at 213–215° C., giving a crystallized salt with hydrochloric acid and possessing valuable physiological properties.

In testimony whereof I have hereunto set my hand.

HANS HAHL.